United States Patent [19]

Austin

[11] 4,058,036
[45] Nov. 15, 1977

[54] ADJUSTABLE SPINDLE LINER TUBE OR FILLER TUBE

[76] Inventor: Richard Arnold Austin, 35 Ohio Ave., West Springfield, Mass. 01089

[21] Appl. No.: 704,047

[22] Filed: July 9, 1976

[51] Int. Cl.$^2$ .................. B23B 25/00; B23B 23/02
[52] U.S. Cl. ........................................ 82/38 A; 82/45
[58] Field of Search ............... 82/38 R, 38 A, 2.5, 82/2.7, 45

[56] References Cited

U.S. PATENT DOCUMENTS

| 3,802,689 | 4/1974 | Doe ...................................... | 82/45 X |
| 3,927,585 | 12/1975 | Austin .................................. | 82/38 A |

FOREIGN PATENT DOCUMENTS

| 2,354,742 | 5/1975 | Germany ............................. | 82/38 A |

*Primary Examiner*—Harrison L. Hinson
*Attorney, Agent, or Firm*—Ross, Ross & Flavin

[57] ABSTRACT

An adjustable support for supporting bar or tube stock serving a turning machine spindle or feeder or stock support tube or the like. It includes a tube having therethrough a through-opening of infinitely variable diameter concentric with the tube center line and coincident with the work centerline of the served unit. The tube accommodates along its length a plurality of stock-supporting sections and at least one elongated longitudinally extending pusher-puller bars. Each such section is defined by a pair of pushers and a pair of opening-defining stock-supporting rings. The pushers and rings of each pair are mounted in spaced alternating disposition along the tube length. Each ring has a pair of diametrically-opposed oppositely-facing tongues, each extending outwardly from one of its sides. The rings of the pair are trunnion mounted relative to the tube with their axes disposed 90° apart, and are swingable unisonly between an opened stock-non-supporting position and myriad closed stock-supporting positions. In opened position, they define a tube-through-opening of maximum diameter, and in closed positions, they define a tube-through-opening of less than maximum diameter as determined by the projection of the tongues inwardly toward the tube centerline. The diameter is variable in indirect ratio with the degree of ring angularization — the greater the angularization, the smaller the through-opening. The pushers are fixed to the pusher-puller bar or bars so as to be movable in opposite directions lengthwise of the tube. As the pusher-puller bars and pushers are driven in one direction, each pusher is moved into a contacting relationship with a respective ring, the pusher pushing its ring in a swinging through-opening defining movement on its respective axis and a supporting embracement of each tongue with the stock periphery and as driven in counter direction a connector between each pusher and its respective ring pulls the rings away from non-stock supporting positions.

17 Claims, 10 Drawing Figures

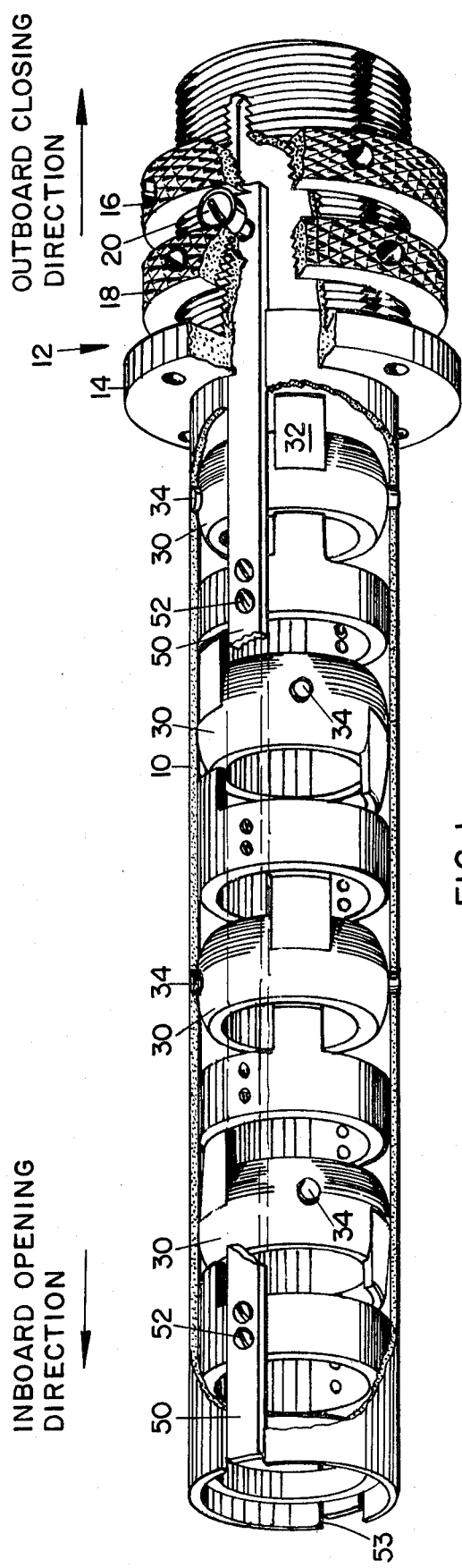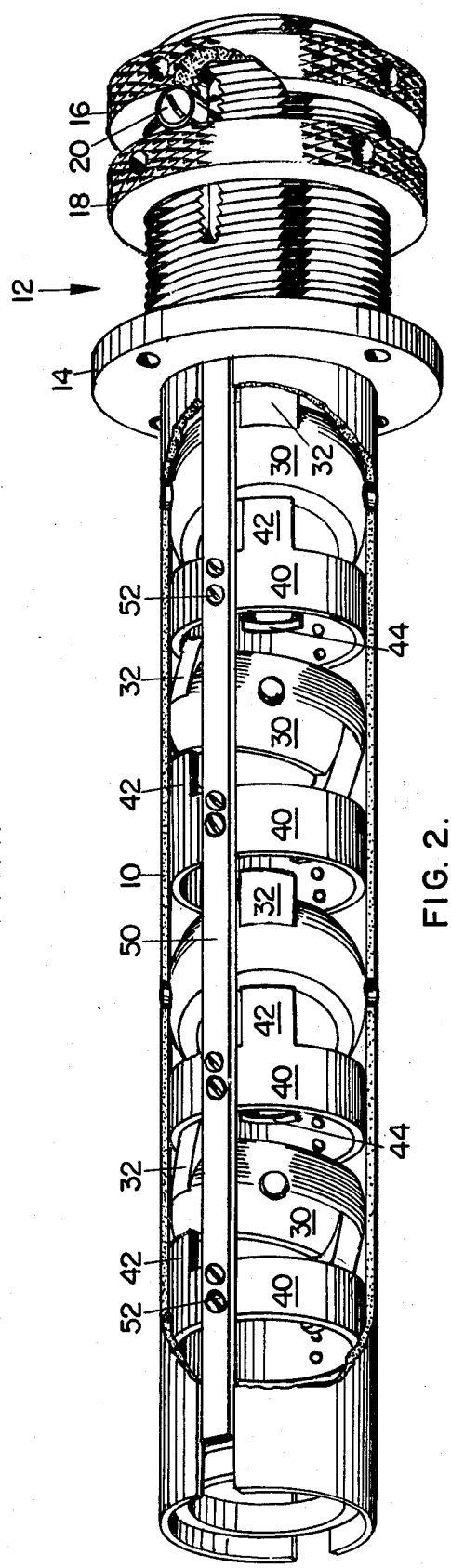

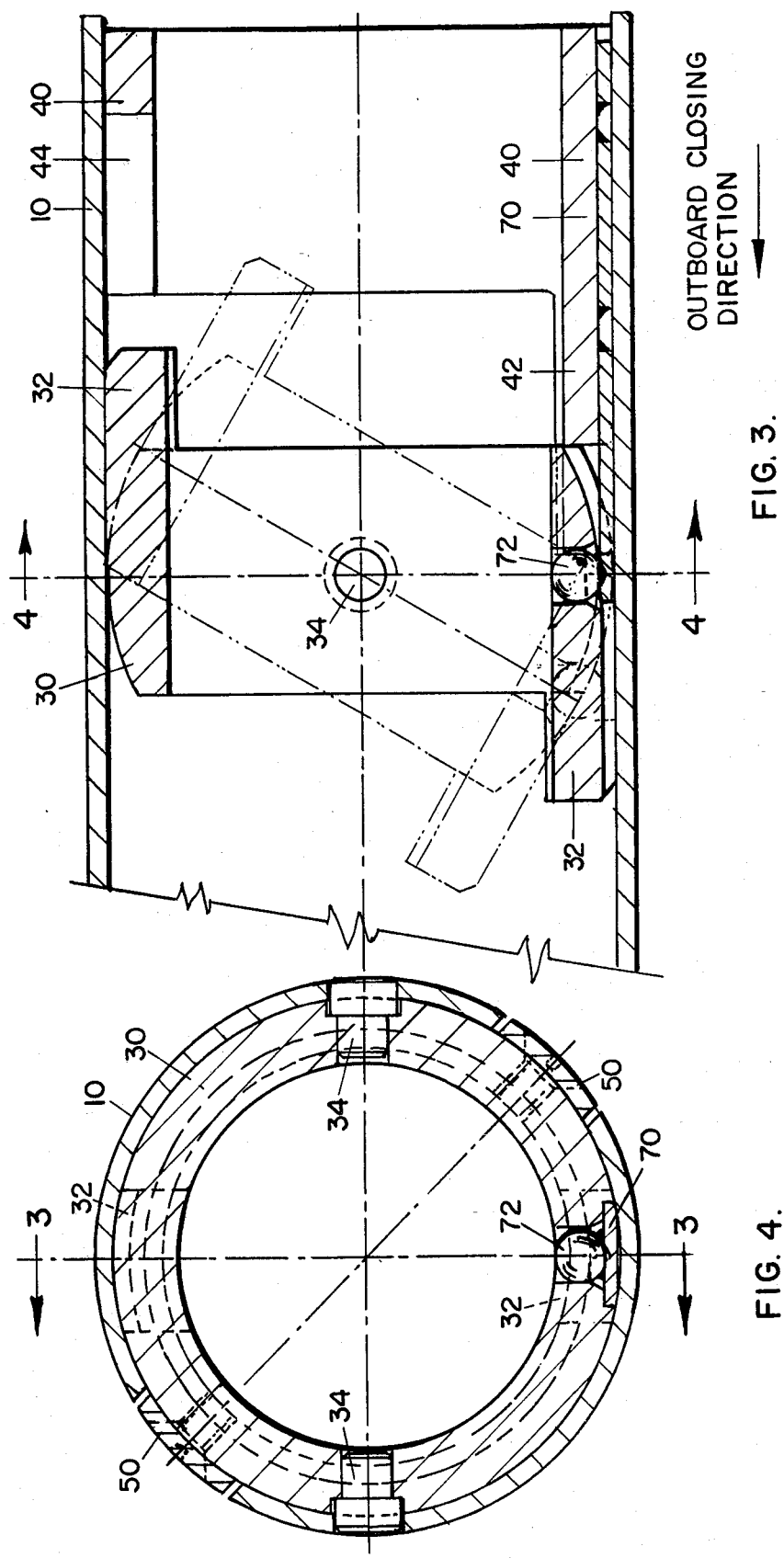

INBOARD OPENING DIRECTION →

OUTBOARD CLOSING DIRECTION ←

ADJUSTABLE SPINDLE LINER TUBE OR FILLER TUBE

The invention relates to a stock support for supporting stock, be it in bar or tube form of round, square, hexagonal or other configuration, concentrically within a turning machine spindle or the like, same being utilizable in a wide variety of applications requiring an infinitely variable inside diameter along a constant fixed center line.

It will be understood at the outset that the invention may be advantageously used as a liner in the hollow spindle of a turning machine, as a liner in the hollow stock reel tube of a multi-spindle turning machine, as a liner in the hollow tube used as a stock support, as a part of an arrangement for feeding same through a turning machine spindle, or as a device for gripping a stock end and pulling or pushing same through a turning machine spindle and chucking device. With a cooperant stand, it can serve as a simple exterior bar support and stabilizer. With a single motorized station, it serves as an automatic bar or tube feeder. With a stand and pneumatic cylinder, it can function as a combination spindle liner and feeder.

Capacitywise, variously sized models can serve any spindle or draw tube size.

Broadly speaking, the invention comprehends a tube through which the stock is passed, the stock being supported therein by other components inclusive of a plurality of pairs of fixed puller rings and a plurality of pairs of swingable spherical support or opening-defining rings mounted in alternating disposition in spaced relationship within and along the tube length. The support or opening-defining rings, of each pair, trunnion mounted in the tube, have axes disposed 90° apart and are swingable unisonly between opened stock non-gripping and various closed stock gripping positions. In opened position, they are disposed concentric with the tube cooperantly to define a tube through opening of maximum diameter centered on the tube centerline. In closed position, they are disposed angularly relative to the tube so as cooperantly to define a tube through opening of less than maximum diameter, the latter diameter being variable in indirect ratio with the degree of ring angularization; the greater the angularization, the smaller the tube through opening. Elongated longitudinally-extending puller fingers, to which the puller rings are fixed, are movable lengthwise of the tube in slots therealong in outboard and inboard directions through externally-mounted manually-rotatable closing and opening nuts respectively. As the puller fingers and puller rings are driven in outboard direction, the puller rings are each moved into an actuating relationship with its next adjacent opening-defining rings, each puller ring urging its opening-defining ring in a swinging movement on its individual axis toward a desired opening-defining position providing a desired concentric through opening through the tube and a closure upon the sides of the stock being served. As the puller fingers and puller rings are driven in inboard return direction, interconnecting means between each puller ring and cooperant opening-defining ring causes the opening-defining ring to be pulled returnably therewith, with the through opening being enlarged accordingly.

The concept makes use of sections of subassemblies, the number of sections employed in a particular case depending on the tube length and the length of stock to be supported.

Each section includes a pair of fixed pull rings and a pair of pivotal spherical opening-defining rings, the same being disposed in spaced relation to each other along the tube interior with the opening-defining rings being actuatable unisonly between stock non-gripping and gripping positions by means of pull strips which, when driven in an outboard direction along and relative to the longitudinal wall of the tube drive the fixed pull rings therewith, the latter in turn causing the opening-defining rings to be swung therewith into a desired opening-defining position.

The result is an open center design where the diameter of the defined opening along the fixed centerline of the tube may be infinitely variable according to the angularization of the spherical or opening defining rings. Tongues of slightly arcuate configuration are fixed to and extend outwardly from the outer periphery of each spherical ring, and are disposed tangential to the line of maximum outside diameter and at 90° to each other, with one tongue extending in an inboard direction and one extending in an outboard direction. The tongues of the spherical rings of each pair thereof move toward and away from the centerline as their rings are swung on their respective pivots to define a radially expandable and contractible through opening. The tongues serve in the manner of a chuck for internally gripping the stock at spaced points along its longitudinal axis and radially outwardly of its centerline.

Stated otherwise, one primary object hereof is to provide an adjustable support which defines a through opening longitudinally of a tubular shell, which opening has an infinitely variable diameter around a constant fixed centerline, with such opening, when the shell is inserted in such as a spindle, being variable as desired for holding stock relative to that centerline and to that spindle.

By the invention, the usual arsenal of tubes of various inner diameters supporting bushings and the like is replaced, set-up and change-over time is drastically reduced, stock surface finish or profile is in no way affected, stock whip in the spindle is eliminated, and stock of varying degrees of straightness is readily accommodated. Improved finish of the turned surface and reduction of push-back or part slippage in the machine holding device are also achieved herewith. Further advantages are realized in the elimination of the usual problems of stock feeding, supporting and reloading, all recognized as troublesome considerations in normal turning machine operations, and accordingly, obvious increases in operator productivity are obtained.

It is well recognized in the art that the feeding of bar stock limits the cutting quality in the work area, if the stock is vibrating on the opposite side of the chuck. Known feeder tubes and liners allow the tube and bar stock to wobble or turn off center. In the absence of constraining means, they bend out, and worse, perform much in the manner of large cranks with obvious deleterious results.

It was to upgrade turning machine performance at any speed, especially high speeds, that the adjustable spindle-liner tube or filler tube of this invention was developed, all leading to a means which can increase turning speeds by as much as 35–40%, allowing the turning of a 2 inch stock at as much as 3000 r.p.m. without any working of the chuck collet pads.

Its genesis began with the development of a set of cage sections to support round stock as it was fed through a lathe spindle, a compression mechanism with springs being cooperant therewith to cause each of the cage sections to shift through a series of infinitely variable diameters so as to complement any particular stock diameter. A circumscribing filler tube fit into the spindle and turned therewith for holding the tube steady and helping reduce noise and vibration.

To accommodate to increases in turning speeds beyond 1000 rpm, thin, flat backup springs were next added to the cage section exteriors, allowing speeds of as much as 2000–2200 rpm with stock diameters of 1 inch or more. The design allowed smaller bars and tubes in the $\frac{1}{2}$ inch – $\frac{3}{4}$ inch area to turn at as much as 3000 rpm.

With these early experiments with increasingly higher rotating speeds, larger stocks would become eccentric and start to wobble. This might occur because the bar would be slightly bent, or kicked off center by the chuck as it closed on a bent bar. The high centrifugal force thus generated would worsen the situation and wobbling could go to such excessive proportions as to result in stock loss.

The next sequential development was toward a more rigid design which allowed rotative speeds of up to 2500 rpm on larger stocks and 3000 rpm on 1 inch stocks, but carried the concomitant objection that the liner consumed too much of the hole size.

The improved holding means of the present invention has been the ultimate result, a single apparatus now replacing a plurality of some of the prior art conventional devices, all leading to significant economies in space as well as set up time and offering salient advantages in that it: adds rigidity to the stock, supports the stock and maintains it on center, eliminates working of the pad, allows a smoother turning operation, solves noise problems even without any dynamic balancing of units, avoids bar sloshing to allow the jaws to maintain a better grip against the turning forces with almost no pushback, and allows an even and perfectly centered gripping action.

If desired the device may be used in combination with a pushbar feeder, particularly desirable for use with high speed chucks running stock lengths of say 6 to 8 ft. and conceivably even 12 ft. while consuming a minimum of floor space. It offers an economical approach for users of turning equipment having a high percentage of chucking work and yet some modest bar requirements.

Use of the feeder eliminates the need to pull stock from the turret by friction meaning that the operator does not have to change the size of puller pads for changes in stock sizes, and that another station on the turret is made available. Also, orientation problems such as an operator would have with hex or square stock and a turret-mounted puller are obviated.

In the drawings:

FIG. 1 is a fragmentary view in perspective of the device, with parts broken away for clarity, and showing the components in their first stock-non-gripping relationship;

FIG. 2 is a fragmentary view in perspective of the FIG. 1 device showing the components in one of their second stock-gripping relationships;

FIG. 3 is a fragmentary view in section showing a section on a greatly enlarged scale;

FIG. 4 is a view in section on line 4—4 of FIG. 3;

Figure 8:
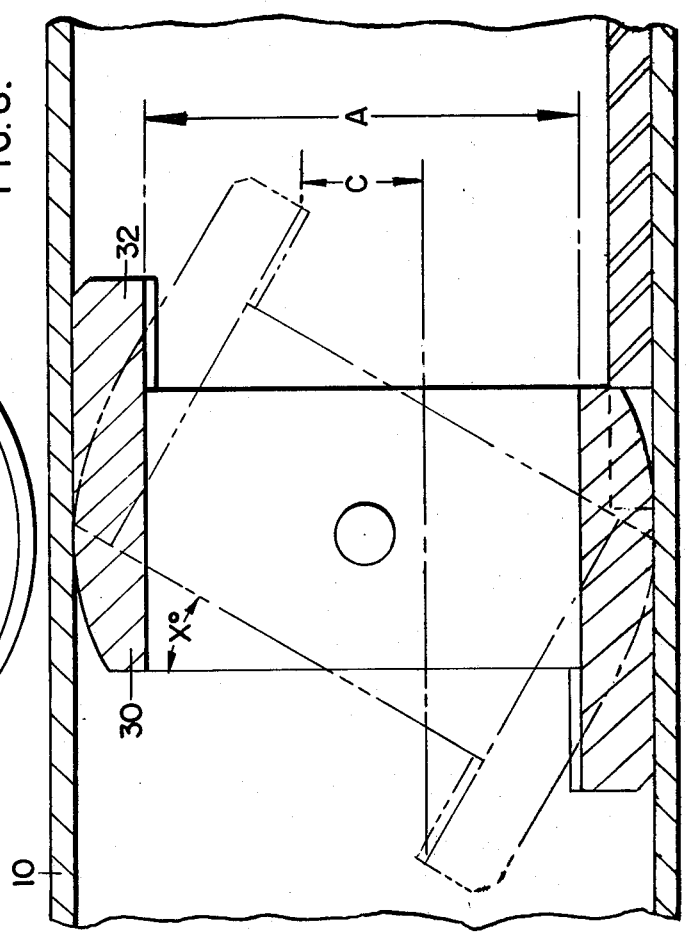
Figure 7:
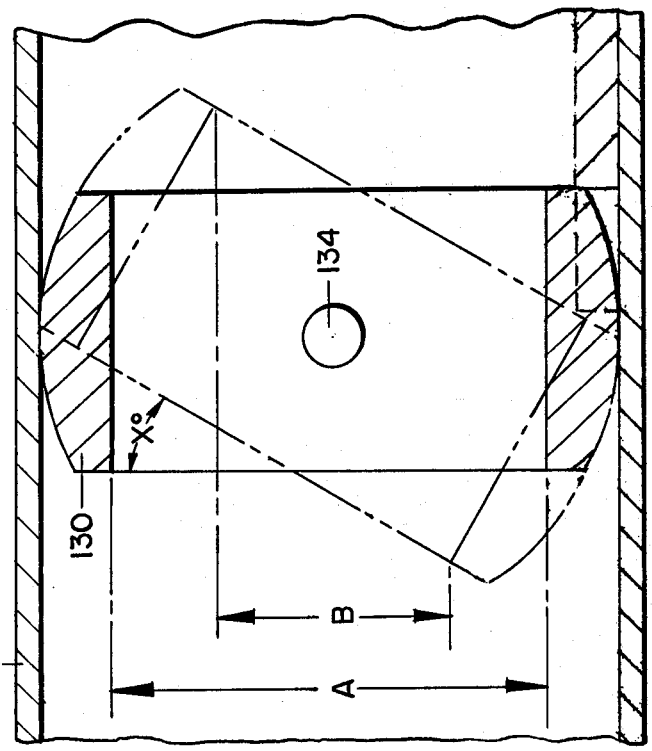
Figure 10:
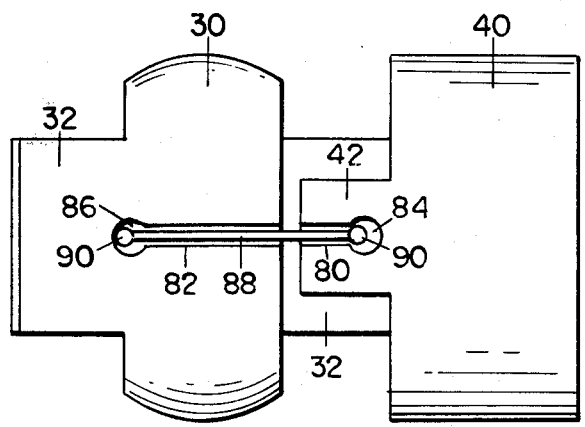
Figure 9:
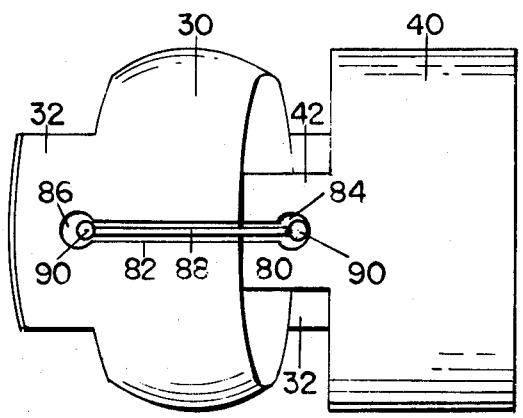

FIGS. 7 and 8 are generally schematic views illustrating the opening-defining function of an opening-defining ring without, and with its cooperant tongues respectively; and FIGS. 9 and 10 are enlarged fragmentary views in top plan showing a puller ring and its cooperant opening-defining ring and the interconnecting means therebetween, FIG. 9 showing the components in the driving relationship, the puller ring having driven the opening-defining ring to an opened position, and FIG. 10 showing the components in the pulling relationship via the interconnecting means, the puller ring pulling the opening-defining ring returnably to upright position for defining a through opening of maximum diameter.

For orientation purposes, outboard and inboard directions are indicated in various views by identified arrows. It is to be understood that the apparatus can be designed so as to travel equally well in either direction relative to a machine being served.

An outer cylindrical longitudinally-extending tube 10 serves as an outer supporting shell and is provided at its outboard end with an externally threaded head or actuator generally indicated by 12 and a tube locking ring 14. A pair of opening and closing nuts 16 and 18 respectively are threadedly engaged with the actuator threads and are provided with a pair of puller strip bearings 20 disposed therebetween on diametrically opposite sides of the actuator.

The opening and closing nuts bear against the puller strip bearings as each is in turn rotated to move puller strips to be described, the closing nut 18 being rotated to move the puller strips in outboard direction and hence the spherical rings in opening-diminishing direction, and the opening nut 16 being rotated to move the puller strips in inboard direction and hence the spherical rings in opening-enlarging direction.

In lieu of opening and closing nuts 16, 18, centrifugal actuators conceivably could be employed as exemplified in my own U.S. Pat. No. 3,927,585 of Dec. 23, 1975.

Tube 10 may be inserted at its inboard end into a spindle or filler tube so as to be supported thereby. Where appropriate, it may be supported by a conventional stand so as to lie in horizontal disposition at a desired height; same not being shown, it not being a part of the invention. If a draw tube is employed, the tube hereof could be disposed therewithin. Where a manual chuck may be involved, the tube could be adapted to fit directly upon the spindle.

For purposes of exemplification, assume the spindle hole to be $2\frac{5}{8}$ inches in diameter and the tube opening diameter to be $2\frac{1}{8}$ inches in diameter. As will be made clear, the tube through opening diameter will be adjustable in infinite increments from say a maximum range of 2 inches in diameter to as small as say $\frac{1}{4}$ inch in diameter.

The means by which through opening adjustability is accomplished comprehends an arrangement of spaced swingable spherical opening-defining rings 30, each having a spherical outside diameter such as to allow a constant bearing relationship with the inside tube wall as the ring is angularized relative to the tube on its opposite pivot pins 34 interconnecting ring 30 and tube 10.

Each ring 30 has a pair of arcuate tongues 32 welded thereto at diametrically opposite sides in such manner as to provide an outside surface tangential to and extendable radially outwardly from the line of maximum outside diameter of the ring, and an inside surface aligned with and conforming to the ring inside diameter.

Puller rings 40, annular in configuration, are each provided with an arcuate tongue 42 integral therewith or welded thereto and extendable radially outwardly therefrom at one side of the puller ring. Diametrically opposite the tongue 42 and at the same side of the puller ring is an inwardly extending clearance recess 44.

The puller rings 40 are interdigitated with the spherical rings 30; that is, the arrangement is one of alternating spherical and puller rings throughout the tube length. A so-called section of such arrangement is comprised of a pair of spherical rings and a pair of puller rings.

Adjacent spherical rings are trunnion mounted on axes at 90° as to each other wherefore a first such ring is pivotable through a first axis and the next adjacent such rings, inboard and outboard thereof, are pivotable through second axes parallel to each other and at 90° as to the first named axis.

It is to be interjected here that the axes need not necessarily be disposed at 90° as to each other, it being entirely conceivable that they might be otherwise disposed.

Figure 6:
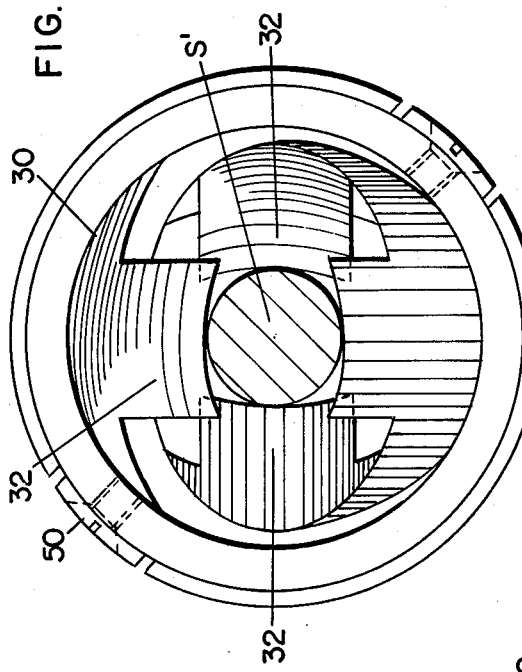
FIGS. 5 and 6 are end elevational views showing the tube and a pair of opening-defining rings cooperantly supporting bars of relatively larger and smaller diameters respectively.
Figure 5:
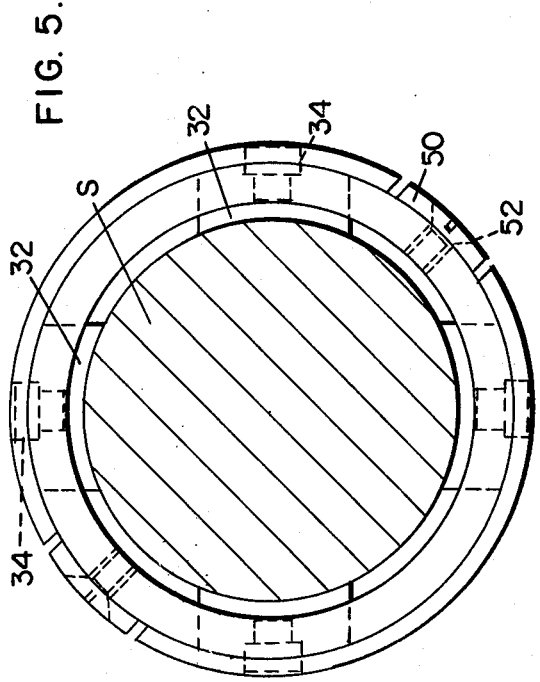

Tongues 32 on adjacent spherical rings are disposed on axes at 90° as to each other so that, in a section, the outer free ends of the tongues provide bearing surfaces in four arcuate areas relative to the periphery of any stock being served, the areas or regions being at 90° as to each other, as can best be appreciated by reference to FIGS. 5 and 6 where, in FIG. 5, stock S is shown as having a relatively large diameter, and in FIG. 6, stock S' is shown as having a relatively smaller diameter.

Puller rings 40 are likewise disposed on axes at 90° as to each other, it being preferred that each puller ring tongue 42 be disposed in axial alignment with the outboard tongue 32 of the next adjacent opening-defining ring which it serves and with which is maintained on interconnection, as will appear.

Puller rings 40 are fixed as by securing means 52 to longitudinally-extending puller strips 50 extendable along provided slots 53 on diametrically-opposite sides of the tube, each mounting a radially outwardly-projecting bearing nut 20 on its outboard terminal.

While through slots 53 are exemplified, they may be replaced by longitudinally-extending recesses in which windows may be suitably spaced therealong to allow access to the puller rings for the interengagement of puller strips and puller rings.

The components of the sections function unisonly as the puller strips are actuated, in an outboard direction by the rotation of closing nut 18, or in an inboard direction by the rotation of opening nut 16.

The tongue of each puller ring will be observed to push on the inboard rim 36 of the next-adjacent spherical ring outboard thereof as the puller strips are actuated in an outboard opening closing or diminishing direction toward head 12, wherefore each spherical ring is caused to pivot on its own axis.

As spherical ring 30 is rotated by the contacting of tongue 42 of its serving puller ring, the aligned outboard tongue 32 is swung inwardly toward the tube center line and the inboard tongue 32 is likewise swung inwardly sweeping through the clearance recess 44. The provided clearance thus permits the disposition of spherical and puller rings in closer adjacency as to each other lengthwise of each other.

The puller strips 50 may be returned in an inboard opening-enlarging direction by the rotation of opening nut 16.

One method for returning the spherical rings to upright or opening enlarging positions is provided, as shown in FIGS. 3 and 4, in a subassembly which includes a finger 70 fixed to each puller ring and extendable radially outwardly therefrom in outboard direction and having a ball 72 fixed thereto, the ball being nestably receivable in a suitable opening in the wall of the adjacent spherical ring being served. Return inboard movement of the puller ring serves to pull the spherical ring therewith.

Another interconnecting system, shown in FIGS. 9 and 10, envisions the provision on the outer surfaces of tongue 42 of the puller ring and the spherical ring served thereby of aligned grooves 80 and 82 respectively and connecting through openings 84 and 86 respectively at opposite extremities, in which grooves and openings a cable 88 may be seated with buttons 90 at opposite cable extremities being fixed to the respective components by way of seating engagement in the respective openings 84 and 86.

Such arrangement serves to drive the spherical rings returnably in inboard direction for any resetting or shifting to a stock of different dimensions.

Particularly significant is the feature of the maximizing of the usable travel of the spherical rings so as to optimize the stock support range.

As will be observed by first reference to FIG. 7, in a case where a tongueless spherical ring 130 might be employed, it will be appreciated that the through opening of maximum diameter when the ring is in its upright position is represented by the letter A, while the through opening of a smaller diameter as the ring is swung through an arc of X° is represented by the letter B.

But with next reference to FIG. 8, it will be observed that in the case of a ring 30 of this invention, with its radially-outwardly extending tongue 32, its opening of maximum diameter is likewise represented by the letter A but its opening of smaller diameter is represented by the letter C as the ring is swung through the identical arc of X°.

It will thus be obvious that the usable travel of the swivel action is maximized so as to optimize the support range, which is to say that the tongues extend the support range for more travel or turning motion of the swivel surfaces.

Whereas spherical rings have been illustrated here as being operable in a pair, along with a pair of puller rings, within a section, it is to be made clear that conceivably a trio or a quartet or other multiple number of spherical rings could be employed conjointly so as to provide the desired opening defining and stock supporting features through the 360° circle.

I claim:

1. An adjustable support for supporting bar or tube stock concentrically relative to the work centerline of a machine tool comprising: a tube, a plurality of variable support opening sections sleeved within and spaced along the axial direction of the tube, and means for adjusting the variable support opening sections for movement into and out of gripping relation with the stock, the sections cooperantly defining a fixed centerline coincident with the work centerline of the machine, each variable support opening section including a plurality of pairs of fixed puller and pivotal spherical rings disposed in spaced relation to each other, puller fingers movable longitudinally relative to the tube, the spherical rings being pivotable relative to the tube, the puller rings being fixedly mounted on the puller fingers, the spherical rings being actuatable unisonly between non-gripping and gripping positions by the actuation of the puller rings on the spherical rings.

2. A variable opening work support comprising in combination: a support tube having a through opening along a longitudinally-extending axis coinciding with the axis of disposition of a work extendable through the tube, means for mounting the work relative to the tube including a plurality of operating sections spaced along and supported within the tube, each operating section including a pair of fixed puller rings and a pair of opening-defining rings, the opening-defining rings being trunnion mounted relative to the tube for varying the cross sectional area of the through opening, puller fingers adjustably-movable relative to the tube with the puller rings being fixed thereto and movable therewith, the puller rings effecting swinging movements of the opening-defining rings according to the longitudinal movements of the puller fingers in through opening varying directions and into and out of work embracing relationships.

3. A variable throat work support comprising: an elongated tubular housing, pairs of fixed puller rings, pairs of pivotable spherical rings, the puller and spherical rings being interdigitated with each other within and along the length of the housing, the spherical rings being trunnion mounted relative to the housing, a pair of puller fingers adjustably-movable relative to the support tube, the puller rings being fixedly mounted relative to the puller fingers, the puller rings effecting swinging movements of the spherical defining rings into and out of stock gripping relationship according to the longitudinal movements of the puller fingers.

4. A variable opening work support for supporting work concentrically relative to a machine or feeder or stock tube comprising:

a longitudinally-extending support tube, a plurality of sections spaced along and supported relative to the support tube interior, each section including a pair of fixed puller rings and a pair of opening-defining rings, the opening-defining rings being trunnion mounted relative to the support tube for biasing unisonly into various positions and cooperantly defining a through-opening through the tube of various cross sectional areas, a pair of puller fingers adjustably-movable relative to the support tube and having the puller rings fixed thereto and movable therewith, the puller rings effecting swinging movements of the opening-defining rings according to the longitudinal movements of the puller fingers.

5. A support for supporting stock concentrically relative to a turning machine spindle or feeder or stock support tube comprising:

a tubular shell, a plurality of pairs of fixed puller and pivotal spherical rings disposed in spaced relation to each other along and interiorly of the shell, puller fingers movable longitudinally relative to the shell, the spherical rings being pivotable relative to the shell, the puller rings being fixedly mounted on the puller fingers, the spherical rings being actuatable unisonly between non-gripping and gripping positions by the actuation of the puller rings on the spherical rings.

6. A variable opening work support comprising:

a tube through which the work is passed, a plurality of pairs of fixed pull rings and a plurality of pairs of swingable spherical opening-defining rings mounted in alternating disposition in spaced relationship within and along the tube length, the opening-defining rings being trunnion mounted in the tube and being swingable unisonly between opened stock non-gripping and various closed stock gripping positions, the opening-defining rings in opened position being disposed concentric with the tube cooperantly to define a tube through opening of maximum diameter and in closed position being disposed angularly relative to the tube cooperantly to define a tube through opening of less than maximum diameter, longitudinally-extending pull strips being movable in slots along and lengthwise of the tube in outboard and inboard directions and having the pull rings fixed thereto, closing and opening means for driving the pull strips and pull rings in outboard direction with the pull rings being moved into a pulling relationship with the opening-defining rings and with each pull ring swinging a next-adjacent opening-defining ring toward a desired opening-defining position providing a desired concentric through opening through the tube and in inboard direction with the pull rings causing the opening-defining rings to be pulled returnably therewith and with the through opening being enlarged accordingly.

7. A variable opening work support comprising in combination: a support tube having a through opening along a longitudinally-extending axis coinciding with the axis of disposition of a work extendable through the tube, means for supporting the work concentrically relative to the tube including a plurality of operating units spaced along and within the tube, each operating unit including an opening-defining ring and a cooperant puller ring, the opening-defining rings of the units being trunnion mounted relative to the tube for varying the cross sectional area of the through opening, a puller finger adjustably-movable relative to the tube with the puller rings of the units being fixed thereto and movable therewith, the puller rings effecting swinging movements of the respective opening-defining rings according to the longitudinal movements of the puller finger in through opening varying directions and into and out of embracing relationships with the work extendible through the tube.

8. A variable throat work support for concentrically supporting work relative to a centerline of a machine or feeder or stock tube comprising: an elongated tube having a plurality of variable support opening units, and area varying means in each of the units for defining a through opening through the tube of variable cross sectional area for accommodating work extendible therethrough and circumscribing same in a work-gripping relationship, the means including pairs of fixed puller and pivotal spherical rings and puller fingers movable longitudinally relative to the tube with the spherical rings being pivotal relative to the tube and with the puller rings being fixed on the puller fingers.

9. A variable throat work support comprising: an elongated tubular housing, a plurality of fixed puller rings, a plurality of pivotable spherical rings, the puller and spherical rings being interdigitated with each other within and along the length of the housing, the spherical rings being trunnion mounted relative to the housing, pull means adjustably-movable relative to the housing, the puller rings being fixedly mounted relative to the pull means and movable therewith, the puller rings effecting swinging movements of the spherical rings into and out of stock gripping relationship according to the longitudinal movements of the pull means.

10. A variable opening work support comprising:
   a longitudinally-extending support tube divided into sections spaced along the support tube interior,
   each section including a plurality of fixed puller rings and a plurality of opening-defining rings,
   the opening-defining rings being trunnion mounted relative to the support tube for biasing into a multiplicity of a through-opening defining positions of various cross sectional areas,
   puller means adjustably-movable relative to the support tube with the puller rings being fixed thereto and movable therewith,
   the puller rings effecting swinging movements of the opening-defining rings according to the longitudinal movements of the puller means.

11. A support for supporting stock concentrically relative to a turning machine spindle or feeder or stock support tube comprising:
   a tubular shell, a plurality of fixed puller rings and a plurality of pivotal spherical rings disposed in spaced relation as to each other along and interiorly of the shell,
   puller means movable longitudinally relative to the shell,
   the spherical rings being pivotable relative to the shell,
   the puller rings being fixedly mounted on the puller means,
   the spherical rings being actuatable unisonly between non-gripping and gripping positions by the actuation of the puller rings relative to the spherical rings.

12. A variable opening work support comprising: a tube through which the stock is passed, a plurality of fixed pull rings and a plurality of swingable spherical opening-defining rings mounted in alternating disposition in spaced relationship within and along the tube length, the opening-defining rings being trunnion mounted in the tube and having axes disposed angularly as to each other and being swingable unisonly between opened stock-non-gripping and various closed stock-gripping positions, the opening-defining rings in opened position being disposed concentric with the tube cooperantly to define a through opening in the tube of maximum diameter and in closed position being disposed angularly relative to the tube cooperantly to define a through opening of less than maximum diameter, longitudinally-extending pull means, the pull rings being fixed to the pull means, the pull means being movable lengthwise of the tube in outboard and inboard directions, interconnecting means between each pull ring and its cooperant opening-defining ring, externally-mounted manually-rotatable closing and opening nuts for driving the pull means and pull rings in outboard closing direction with each pull ring urging a next-adjacent opening-defining ring in a swinging movement on its individual axis toward a desired opening-defining position and in inboard opening direction for effecting the opening-defining ring to be pulled returnably by its cooperant pull ring through its interconnecting means.

13. An adjustable support for supporting bar or tube stock concentrically relative to the work centerline of a machine comprising:
   a. a tube,
   b. a plurality of variable support opening sections sleeved within and spaced along the axial direction of the tube, and
   c. pusher-puller means movable in opposite directions longitudinally relative to the tube for operating the variable support opening sections into and out of stock-supporting relation,
   d. the sections cooperantly holding the stock concentrically relative to the tube centerline coincident with the machine work centerline;
   e. each variable support opening section including -
      1. a pair of slidable fingers,
      2. a pair of pivotable opening-defining rings pivoted to the tube,
      3. the fingers and the rings of the respective pairs being disposed in alternating spaced relationship with each other,
      4. each finger being fixed to the pusher-puller means and being cooperant with an adjacent respective ring,
      5. a connector between each finger and respective ring,
      6. the rings being actuatable unisonly from a stock-non-supporting position to a stock-supporting position responsively to the pushing of each respective ring by its finger as the pusher-puller means is motivated in one direction and reversely from a stock-supporting position to a stock-non-supporting position responsively to the pulling of each respective ring by its connector as the pusher-puller means is motivated in counter direction.

14. In the adjustable support of claim 13, including means for mechanically and selectively driving the pusher-puller means in the one direction or the counter direction.

15. In an adjustable support for supporting bar or tube stock serving a turning machine spindle or feeder or stock support tube or the like along a fixed center line and coincident with the work centerline of the served unit, the combination of:
   1. a longitudinally-extending tube having a through-opening therethrough and centrally thereof,
   2. a plurality of stock-supporting sections for varying the diameter of the tube through-opened disposed in spaced relationship along the tube length,
   3. a pusher-puller means movable longitudinally of the tube for operating the stock-supporting sections into and out of supporting relation to the stock,
   4. each stock-supporting section including -
      a. a pair of slidable pushers,
      b. a pair of opening-defining rings pivotally mounted on the tube,
      c. the pushers and rings of the respective pairs being disposed in alternating spaced relationship with each other, d. each pusher being fixedly mounted on the pusher-puller means and being cooperant with a respective ring,
e. a connector between each pusher and respective ring,
f. the rings being actuatable unisonly from a stock-non-supporting position of maximum through opening diameter to myriad stock-supporting positions of lesser through-opening diameter responsively to the pushing of each respective ring by its pusher as the pusher-puller means is motivated in one direction and reversely from the stock-supporting position to the stock-non-supporting position responsively to the pulling of each respective ring by its connector as the pusher-puller means is motivated in counter direction.

16. In the adjustable support of claim 15, each ring being defined by a pair of diametrically-opposed oppositely-facing tongues extending outwardly therefrom.

17. In the adjustable support of claim 16, the through-opening diameter being variable in indirect ratio with the degree of ring angularization with greater angularization defining smaller the through-opening diameter as determined by the extension of the tongues into the path of the tube-through-opening.

* * * * *